(12) United States Patent
Pigott

(10) Patent No.: US 10,393,597 B2
(45) Date of Patent: Aug. 27, 2019

(54) OVER-TEMPERATURE DETECTOR WITH TEST MODE

(71) Applicant: NXP USA, Inc., Austin, TX (US)

(72) Inventor: John M. Pigott, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 37 days.

(21) Appl. No.: 15/945,520

(22) Filed: Apr. 4, 2018

(65) Prior Publication Data

US 2018/0224339 A1 Aug. 9, 2018

Related U.S. Application Data

(62) Division of application No. 14/574,026, filed on Dec. 17, 2014, now Pat. No. 9,939,335.

(51) Int. Cl.
*G01K 15/00* (2006.01)
*G01K 3/00* (2006.01)

(52) U.S. Cl.
CPC ........... *G01K 15/007* (2013.01); *G01K 3/005* (2013.01)

(58) Field of Classification Search
CPC ....... G01K 15/007; G01K 3/005; H03K 17/30
See application file for complete search history.

(56) References Cited

U.S. PATENT DOCUMENTS

| | | | | |
|---|---|---|---|---|
| 4,553,048 A * | 11/1985 | Bynum | ...................... | G05F 3/30 323/315 |
| 4,924,212 A * | 5/1990 | Fruhauf | .................. | G01K 3/005 327/512 |
| 5,063,342 A * | 11/1991 | Hughes | .................. | G01K 3/005 323/315 |
| 5,821,741 A * | 10/1998 | Brokaw | .................. | G05F 3/245 323/311 |
| 6,288,638 B1 * | 9/2001 | Tanguay | .................. | G01K 7/20 340/511 |
| 6,342,997 B1 * | 1/2002 | Khadkikar | ............. | G01K 3/005 361/100 |
| 2004/0036460 A1 * | 2/2004 | Chatal | ..................... | G05F 3/267 323/313 |
| 2004/0135599 A1 * | 7/2004 | Kim | ....................... | G01K 3/005 327/78 |

(Continued)

*Primary Examiner* — Lisa M Caputo
*Assistant Examiner* — Philip L Cotey
(74) *Attorney, Agent, or Firm* — Sherry W. Schumm

(57) ABSTRACT

A device for over-temperature detection having a test mode is presented. The device includes a temperature detection circuit having first and second transistors. The temperature detection circuit is configured so that when an ambient temperature of the temperature detection circuit is less than a temperature threshold, a voltage at an emitter terminal of the second transistor is less than a voltage at an emitter terminal of the first transistor minus $V_T*\ln(N)$, and when the ambient temperature of the temperature detection circuit is greater than the temperature threshold, the voltage at the emitter terminal of the second transistor is greater than a voltage at the emitter terminal of the first transistor minus $V_T*\ln(N)$. The device includes a measurement circuit configured to generate an output voltage that is proportional to a difference between the temperature threshold of the temperature detection circuit and the ambient temperature of the temperature detection circuit.

18 Claims, 4 Drawing Sheets

(56) References Cited

U.S. PATENT DOCUMENTS

| | | | |
|---|---|---|---|
| 2005/0038625 A1* | 2/2005 | Ravatin | G01K 3/005 |
| | | | 702/130 |
| 2005/0104151 A1* | 5/2005 | Wachi | G01K 7/01 |
| | | | 257/470 |
| 2005/0179575 A1* | 8/2005 | McLeod | G01K 7/01 |
| | | | 341/144 |
| 2005/0185491 A1* | 8/2005 | Kim | G11C 11/406 |
| | | | 365/222 |
| 2007/0076342 A1* | 4/2007 | Arndt | H03K 17/08142 |
| | | | 361/103 |
| 2008/0208513 A1* | 8/2008 | Dupuy | H01L 23/34 |
| | | | 702/132 |
| 2009/0027820 A1* | 1/2009 | Doi | H01L 27/0248 |
| | | | 361/86 |
| 2011/0234300 A1* | 9/2011 | Zhang | G01K 7/01 |
| | | | 327/512 |
| 2013/0057995 A1* | 3/2013 | Feldtkeller | G01K 7/01 |
| | | | 361/87 |
| 2013/0119869 A1* | 5/2013 | Peng | H05B 33/0818 |
| | | | 315/125 |

* cited by examiner

OVER-TEMPERATURE DETECTOR WITH TEST MODE

RELATED APPLICATION

This application is a divisional of co-pending, U.S. patent application Ser. No. 14/574,026, filed on Dec. 17, 2014.

FIELD OF USE

The present disclosure relates generally to a device for temperature detection, and more specifically, to a device for over-temperature detection that provides a test mode enabling testing of the device.

BACKGROUND

Integrated circuits are used in many different applications, some of which expose the integrated circuits to extreme ambient temperatures. In some devices, particularly those that utilize relatively high power, the high ambient temperature in combination with high internal power dissipation can cause the device's internal temperature to rise to extreme levels, potentially causing damage or failure.

An over-temperature detector is configured to detect those potentially damaging high-temperature conditions and provide an output signal that may be utilized by an external system to take an appropriate mitigating action. In some cases, this may involve shutting down or reducing power dissipated in the integrated circuit.

One approach for detecting temperature in such a detector involves monitoring variations in the base-emitter voltages ($V_{BE}$) of combinations of bipolar transistors, where $V_{BE}$ is temperature- and bias current-dependent. When a particular temperature threshold is reached or exceeded, an output of the over-temperature detector changes state (e.g., from a low value to a high value) indicating that an over-temperature condition has been detected.

Because the accuracy of such an over-temperature detector is dependent upon the electrical characteristics of the transistors, which themselves are derived from the physical geometry and doping of the transistors, any variances or defects in manufacturing process can affect the accuracy of the detector. As such it can be important to test the accuracy of an over-temperature detector following manufacture to confirm proper operation. But such testing can be difficult.

The majority of devices that are utilized for testing the operation of integrated circuits are unable to generate the high temperatures necessary to trigger over-temperature detection. To compensate, some over-temperature detectors may be placed in a 'test mode' that causes the over-temperature detector to identify an over-temperature condition at a greatly reduced ambient temperature. In essence, the test mode artificially reduces the temperature threshold for the detector by a number of degrees (e.g., 100 degrees Celsius). Although this approach enables a testing device to confirm that an over-temperature detector will, in fact, trigger an over-temperature warning signal, the test mode does not allow for an evaluation of the accuracy of the detector. Additionally, should the detector, once testing is complete, be inadvertently left in test mode, the detector may report false over-temperature conditions at the reduced temperature.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
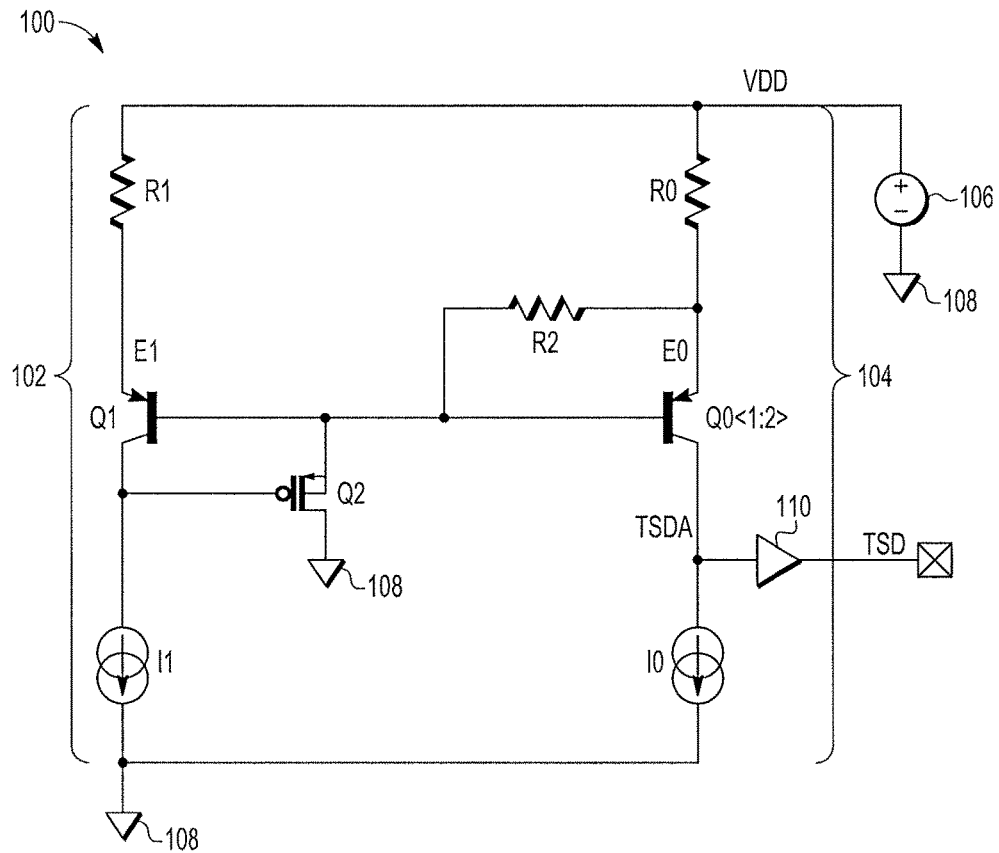
FIG. 1 is a schematic depicting an example over-temperature detector that may be utilized in combination with the testing circuit of the present disclosure.

The following detailed description is exemplary in nature and is not intended to limit the invention or the application and uses of the same. Furthermore, there is no intention to be bound by any expressed or implied theory presented in the preceding technical field, background, or the following detailed description.

For simplicity and clarity of illustration, the drawing figures illustrate the general manner of construction, and descriptions and details of well-known features and techniques may be omitted to avoid unnecessarily obscuring the invention. Additionally, elements in the figures are not necessarily drawn to scale. For example, the dimensions of some of the elements or regions in the figures may be exaggerated relative to other elements or regions to help improve understanding of embodiments of the invention.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus. The term "coupled," as used herein, is defined as directly or indirectly connected in an electrical or non-electrical manner. As used herein the terms "substantial" and "substantially" mean sufficient to accomplish the stated purpose in a practical manner and that minor imperfections, if any, are not significant for the stated purpose.

The present disclosure relates generally to a device for temperature detection, and more specifically, to a device for over-temperature detection that provides a test mode enabling testing of the device.

In conventional over-temperature detector devices, it can be difficult to determine the actual temperature (referred to herein as $T_{LIM}$) at which the detector will indicate an over-temperature condition. This is generally true because testing devices are not able to generate the temperatures necessary to test a detector. Although sometimes the over-temperature detector can be placed into a test mode, which artificially reduces the $T_{LIM}$ value for the detector, such an approach can only confirm that the detector can generate an over-temperature indication, but does not reflect an accuracy of the detector or the actual temperature at which the over-temperature detector will generate an over-temperature output.

In contrast to existing approaches, the present disclosure provides an over-temperature detector that includes a test output that is an analog value indicative of the actual $T_{LIM}$ value for the detector circuit. In one embodiment, the output is an analog voltage value that is a measure or indicator of the difference between the test temperature (i.e., the ambient temperature of the over-temperature detector) and the actual $T_{LIM}$ temperature of the detector. This output enables the accuracy of the detector's $T_{LIM}$ value to be evaluated accurately without a requirement that the detector actually be exposed to a sufficiently high ambient temperature to trigger an over-temperature output.

Furthermore, in the present design, even while the test mode is employed, the over-temperature detector operates normally and provides an over-temperature output at the device's designed $T_{LIM}$. As such, in contrast to the test modes of other devices, which actively modify the device's $T_{LIM}$ value, in the present detector if the test mode were to be inadvertently left operational, the detector would continue to accurately generate an over-temperature indication should the detector's ambient temperature exceeds its designed $T_{LIM}$ value.

FIG. 1 is a schematic depicting an example over-temperature detector 100 that may be utilized in combination with the testing circuit of the present disclosure. Detector 100 is configured to output a thermal shutdown signal (TSD) when an ambient temperature of detector 100 exceeds a particular threshold temperature $T_{LIM}$. When the value at node TSD has a first value (e.g., a high value), that indicates that detector 100 has detected an ambient temperature that exceeds $T_{LIM}$. Conversely, when the value at node TSD has a second value (e.g., a low value), that indicates that the ambient temperature does not exceed $T_{LIM}$. The output TSD can then be connected to other devices that can utilize the TSD signal to take appropriate mitigating action when the over-temperature condition is detected.

Generally, detector 100 includes two different paths 102, 104 connected between a voltage source 106 and ground terminal 108. Each path 102, 104 includes a resistor R1, R0 connected in series with a corresponding current source I1, I0. Current sources I0, I1 and resistors R0, R1 are generally selected so that the voltage drop across R0 is approximately equal to the voltage drop across R1. Accordingly, if current sources I0, I1 are generating the same current flow, the resistance of resistors R0, R1 will be approximately equal. In some implementations of detector 100, current source I1 may generate twice the current of current source I0 (e.g., 20 microamps for I1 versus 10 microamps for I0). In that case, the resistance of R1 may be approximately half the value of the resistance of R0 (e.g., 1.5 kilohms for R1 versus 3 kilohms for R0).

Each of paths 102 and 104 include a transistor Q1, Q0. As illustrated, resistor R0 is connected between voltage source 106 and the emitter of transistor Q0. The collector of transistor Q0 is connected, in turn, to current source I0. Similarly, resistor R1 is connected between voltage source 106 and the emitter of transistor Q1. The collector of transistor Q1 is connected, in turn, to current source I1. The bases of transistors Q0 and Q1 are connected to one another. In various embodiments, transistors Q0 and Q1 are bipolar junction transistors, though other types of transistors may be utilized.

Resistor R2 is connected between the base of transistor Q0 and the emitter of transistor Q0. Accordingly, the voltage across R2 is equal to the $V_{BE}$ of transistor Q0. In various embodiments, R2 has a value that is at least partially determined by the resistances of R1 and R0. For example, when R1 and R0 have values of 1.5 kilohms and 3 kilohms, respectively, R2 may have a value of 27 kilohms. Generally, however, the resistance of R2 will be technology dependent and dependent upon the desired thermal shutdown threshold $T_{LIM}$, so the value of R2 is implementation-dependent.

A source of transistor Q2 is connected to the bases of transistors Q0 and Q1, while the drain of transistor Q2 is connected to a ground terminal (e.g., ground terminal 108). The gate of transistor Q2 is connected to the collector of transistor Q1. Generally, transistor Q2 is implemented as a metal-oxide-semiconductor field-effect transistor (MOSFET), though in other embodiments, other types of transistors may be used. Generally, transistor Q2 operates to cause Q1 to operate like a diode-connected device. In some embodiments, Q1 may, instead, be diode connected.

Q0 and Q1 are configured to have different current densities, so that the $V_{BE}$ difference between the transistors will be proportional to the log of ambient temperature multiplied by the current density ratio between transistors Q0 and Q1. Because the $V_{BE}$ difference between the transistors varies with temperature, detector 100 can utilize the $V_{BE}$ difference between the transistors Q0 and Q1 to determine when an ambient temperature of detector 100 has exceeded a predetermined $T_{LIM}$. In FIG. 1, the emitter voltage of transistor Q0 is equal to the voltage at node E0, while the emitter voltage of transistor Q1 is equal to the voltage at node E1.

In one example, Q0 is implemented as a two-transistor device, while Q1 is implemented as a single transistor device, where each of the transistors in the two-transistor Q0 is of a similar configuration to the single transistor Q1. In such an implementation (where, essentially, Q0 is equal to two Q1s), the current density ratios between the transistors Q0 and Q1 is equal to 2. This causes the difference in $V_{BE}$s between these two devices to equal the thermal voltage ($V_T$) multiplied by the natural log of the current density ratio.

The various components of detector 100 are selected so that at ambient temperatures below the desired $T_{LIM}$, the voltage at node E1 is equal to or greater than the voltage at node E0 plus $V_T$ multiplied by the natural log of the current density ratio. In that condition, the $V_{BE}$ of transistor Q0 is insufficient to cause transistor Q0 to conduct all the current of current source I0. This reduces the analog voltage at the output TSDA toward a ground value, which is, in turn, converted by buffer 110 into a low output value at node TSD. In various embodiments, buffer 110 can be implemented as a complementary metal oxide semiconductor (CMOS)-based inverter including suitably configured P-type metal-oxide-semiconductor (PMOS) and N-type metal-oxide-semiconductor (NMOS) devices. Buffer 110 is generally configured to receive the voltage at node TSDA as an input and, if the voltage is below a threshold value, buffer 110 outputs a low value. In contrast, if the voltage at node TSDA exceeds the threshold value, buffer 110 outputs a high value.

The current in R2 ($V_{BE}(Q0)/R2$) causes an additional voltage drop across R0 (equal to $V_{BE}/R2*R0$). At the $T_{LIM}$ temperature, this additional drop makes the voltage at E0 lower than the voltage at E1 by a value equal to $V_T*\ln(N)$, where * is the multiplication symbol, $V_T$ is thermal voltage, N is a ratio of a current density of the first transistor to a current density of the second transistor, and ln(N) is the natural log of N. This in turn makes Q0 unable to conduct the I0 current source current. At temperatures below $T_{LIM}$, E0 is even lower, and thus Q0 conducts even less current making TSDA low. At temperatures above $T_{LIM}$, Q0's $V_{BE}$ is lower ($V_{BE}$ decreases with temperature), thus R2's current is lower, E0 is higher, and Q0 can conduct more than I0's current; thus TSDA rises.

As the ambient temperature of detector 100 increases, however, the voltage at node E0 increases with respect to the voltage at node E1 and, eventually, E0 increases to the point that the $V_{BE}$ of Q0 (i.e., the voltage across resistor R2) is sufficient to cause Q0 to begin conducting all I0's current. At that point, the voltage at node TSDA increases as the voltage is pulled up close to the voltage of voltage source 106 and the output at node TSD switches to a high value.

The point at which the output of detector 100 switches from a low value to a high value, indicating an over-temperature condition has been detected, is referred to as a balance point for detector 100 and represents the point at which the current flow through Q0 and I0 are balanced. At the balance point, the voltage difference between nodes E0 and E1 is equal to $V_T$ multiplied by the natural log of the current density ratio of transistors Q0 and Q1 and the current supplied by R2 is equal to the $V_{BE}$ of Q0 divided by the value of R2, Q0 is conducting, and the voltage at node TSDA exceeds the threshold at which the output of the detector 100 at node TSD switches from a low value to a high value.

Figure 2:
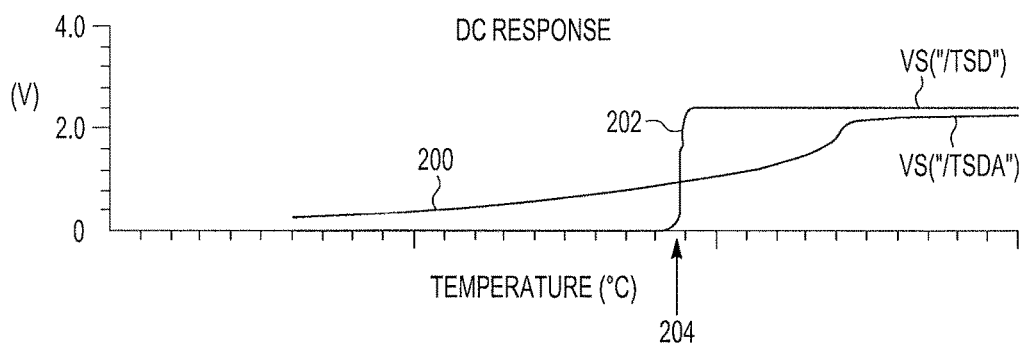
FIG. 2 is a graph showing how the output of an over-temperature detector varies with temperature.

FIG. 2 is a graph showing how the output of detector 100 varies with temperature. The horizontal axis of the graph represents the temperature of detector 100, while the vertical axis represents voltage. Line 200 shows the output at node TSDA, while line 202 shows the output at node TSD.

As illustrated, as the temperature of detector 100 increases, the voltage at node TSDA gradually increases.

When the temperature of detector 100 is below the $T_{LIM}$ value for detector 100, the voltage at node TSDA falls below the threshold value of output buffer 110 and, consequently, buffer 110 outputs a low value indicating that an over-temperature condition has not been detected. Conversely, when the temperature of detector 100 reaches the $T_{LIM}$ value for detector 100, the voltage at node TSDA exceeds the threshold of the output buffer (e.g., buffer 110 of FIG. 1) causing the output of the buffer to go to a high value. This is indicated by point 204 shown on FIG. 2.

As mentioned above, however, in a given detector 100 it can be difficult to determine the $T_{LIM}$ at which detector 100 will generate the high output at node TSD. Accordingly, the present disclosure provides a modification to the circuit configuration of detector 100 that provides a testing or measurement circuit configured to output a voltage that is proportional to the difference between the ambient temperature of the detector and the actual $T_{LIM}$ of the detector. That output signal can be generated at reasonable ambient temperatures (i.e., temperatures that are suitable for testing) and can be used to evaluate the accuracy of the detector and determine the $T_{LIM}$ value for the detector. Additionally, the testing circuit is configured so that even if the testing circuit is left in an operational state, perhaps inadvertently, the detector will continue to operate normally.

Figure 3:
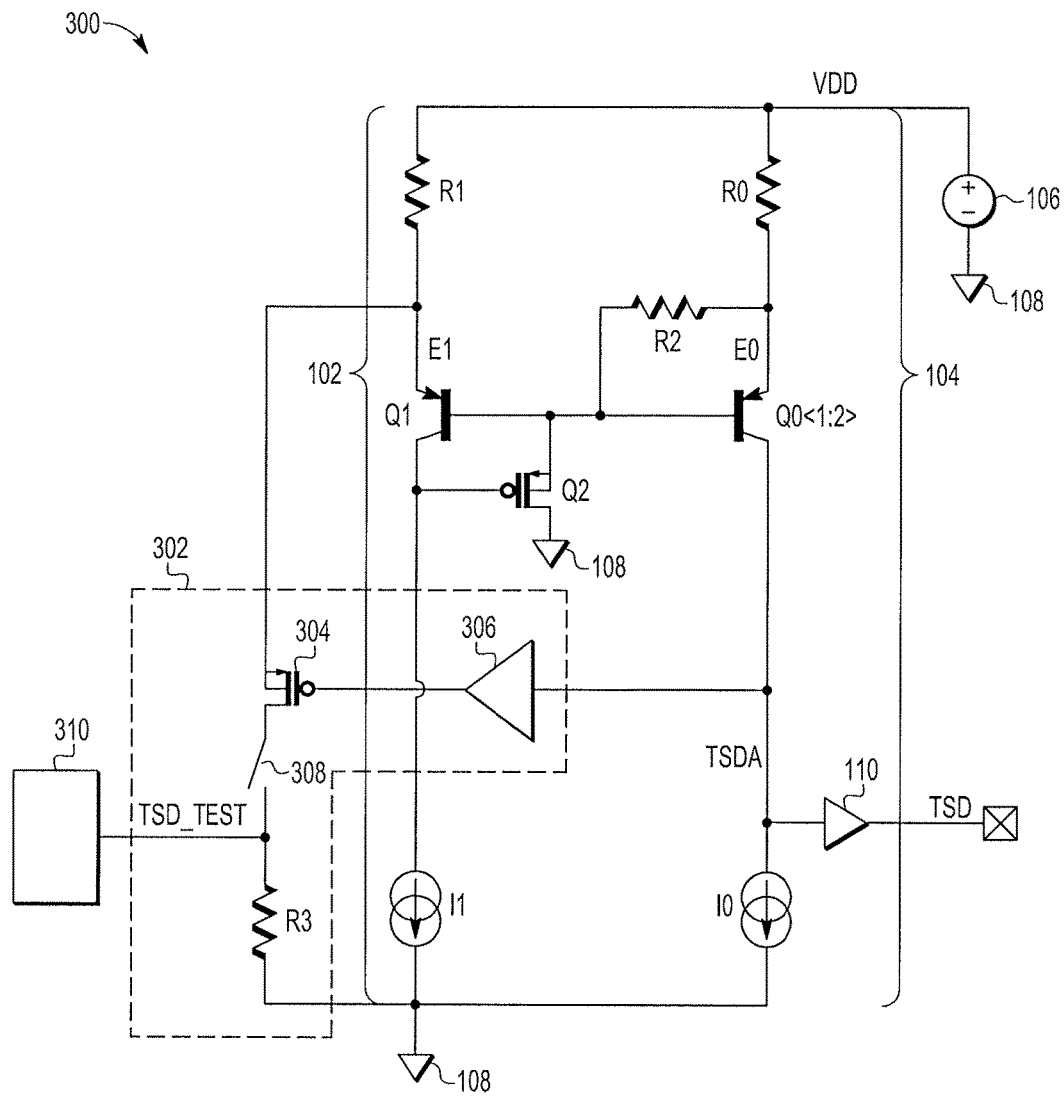
FIG. 3 is a schematic showing an over-temperature detector including a testing circuit configured in accordance with the present disclosure.

Accordingly, FIG. 3 is a schematic showing detector 300 configured in accordance with the present disclosure. Detector 300 includes the over-temperature detector 100 of FIG. 1 with the additional testing or measurement circuit delineated by dashed region 302.

The testing circuit includes transistor 304. The gate terminal of transistor 304 is connected, via amplifier 306, to node TSDA. In one embodiment, amplifier 306 is configured to have a threshold voltage that is lower than the threshold voltage of buffer 110. At temperatures lower than $T_{LIM}$, amplifier 306 drives transistor 304 to cause paths 102 and 104 to balance so that node TSDA rises to the threshold voltage of amplifier 306. In an embodiment, transistor 304 may be implemented as a pmos MOSFET device, although transistor 304 may be implemented as another type of device, in other embodiments.

The source terminal of transistor 304 is connected to node E1 and the drain terminal is connected to a first terminal of resistor R3 via switch 308. A second terminal of resistor R3 is connected to ground terminal 108. In one embodiment, the resistance of R3 is 3 kilohms, however R3 is generally selected to achieve a desired magnitude of signal to be detected at node TSD_Test.

The measurement circuit includes a node TSD_Test. To turn on the measurement circuit, switch 308 is closed. When the measurement circuit is operational, a voltage value at node TSD_Test will be proportional to the difference between the ambient temperature of detector 300 and the actual $T_{LIM}$ of detector 300.

Generally, when operational (i.e., when switch 308 is closed), measurement circuit 302 receives the value of TSDA as an input at amplifier 306. The amplifier is configured so that at low TSDA voltage values, transistor 304 is more conductive and at high voltage values, transistor 304 is less conductive. Accordingly, at ambient temperatures below $T_{LIM}$, R2 consumes sufficient current from path 104 that the voltage at node E0 is too low to cause Q0 to begin conducting and the output TSDA is low. That low voltage is supplied to the gate of transistor 304, causing transistor 304 to be more conductive. As transistor 304 becomes more conductive, the voltage at node E1 is reduced, thereby forcing the voltages E1 and E0 towards one another. Eventually, the voltage at node E1 is sufficiently reduced, that so that Q0 begins conducting. This causes the voltage at node TSDA (which is being supplied at the input of amplifier 306) to begin increasing, causing transistor 304 to become less conductive.

Eventually, a steady state is reached in which paths 102 and 104 are in balance. When both paths 102 and 104 are in balance, the voltage at node TSD_test can be utilized to calculate the value of $T_{LIM}$ for detector 300, as explained below.

The following provides an example analysis of how the analog output at node TSD_Test can be used to determine the actual $T_{LIM}$ value for detector 300. Although the following example makes certain assumptions about the construction of detector 300 and the relative attributes of the various components of detector 300, it will be apparent to a person of ordinary skill in the art that other configurations may instead to be utilized to provide the functionality of detector 300.

In this example, the resistance of $$R_1 = \frac{R_0}{2}$$

and the resistance of $R_3=R_0$. These resistance values are at least partially based upon the relationship between the magnitudes of currents generated by current sources I0 and I1 and the ratio of sizes of Q0 to Q1. In this example, $I_1=2*I_0$ and, as such, Q1 is biased at two times the current of Q0. In this example also, Q0 is twice the size of Q1, so the current density in Q0 is ¼ the current density in Q1.

Given these conditions, the $V_{BE}$s of Q1 and Q0 can be typically approximated by the following equations:

$$V_{BE}(Q1)=BG-t_cT$$

$$V_{BE}(Q0)=BG-t_cT-V_T\ln(4)$$

where $$V_T = k\frac{T}{q} = 8.62e-5*T$$

with a typical $$\frac{R_0}{R_2} = \frac{1}{9},$$

a typical bandgap voltage (BG)=1.27, and typical temperature coefficient (tc) is 1.85 millivolts per degree, and T is temperature in kelvins. Note that the actual value of the tc term above will depend on the specific magnitudes of bias currents I0 and I1.

When the testing mode is operational so that switch 308 is closed pulling both paths 102 and 104 into balance, the voltages at nodes E1 and E0 are governed by the following equation, which is due the variation in current densities in transistors Q0 and Q1, where Q0 is a two-transistor device made up of two transistors each being configured in the same manner as Q1.

$$E_1-E_0=V_T\ln(4)$$

The values of E1 and E0 can then be determined by the following equations, in which $V_{TEST}$ is the voltage value at node TSD_Test and I0 is the current flowing through current source I0 and $V_{BE}(Q0)$ is the base-emitter voltage of transistor Q0.

$$E_1 = V_{DD} - 2*I0*R_1 - \frac{V_{TEST}}{R_3}*R_1 = V_{DD} - I0*R_0 - \frac{V_{TEST}}{2}$$

$$E_0 = V_{DD} - I0*R_0 - \frac{V_{BE}(Q0)}{R_2}*R_0$$

Given that the measurement circuit is operational, the voltage at nodes E1 and E0 are governed by the equation $E_1-E_0=V_T\ln(4)$ resulting in the following:

$$E1-E0 = -I_Q*R_0 - \frac{V_{TEST}}{2} + I_Q*R_0 + \frac{V_{BE}(Q0)}{R_2}*R_0$$

$$V_T\ln(4) = -I_Q*R_0 - \frac{V_{TEST}}{2} + I_Q*R_0 + \frac{V_{BE}(Q0)}{R_2}*R_0$$

or $$\frac{V_{TEST}}{2} = -V_T\ln(4) + \frac{V_{BE}(Q0)}{R_2}*R_0 = \frac{V_{BE}(Q0)}{R_2}*R_0 - V_T\ln(4)$$

It is then possible to simplify and replace variables with known values as follows, where T is the ambient temperature in kelvins:

$$\frac{V_{TEST}}{2} = (BG - t_cT - V_T\ln(4))*\frac{R_0}{R_2} - V_T\ln(4)$$

$$\frac{V_{TEST}}{2} = \left(BG - T\left(t_c + \frac{k}{q}\ln(4)\right)\right)*\frac{R_0}{R_2} - V_T\ln(4) + T\frac{k}{q}\ln(4)$$

$$\frac{V_{TEST}}{2} = BG\frac{R_0}{R_2} - T\left(t_c + \frac{k}{q}\ln(4)\right)*\frac{R_0}{R_2} + \frac{k}{q}\ln(4)$$

$$\frac{V_{TEST}}{2} \cong 0.141 - T*\left(\frac{(1.85\text{ m} + 0.120\text{ m})}{9 + 0.120\text{ m}}\right) = 0.141 - T*0.338\text{ m}$$

Multiplying by 2 to solve for $V_{TEST}$ result in the following:

$$V_{TEST}=0.282-0.676e-3*T\text{(where }T\text{ is in kelvin)}$$

or $$V_{TEST}=0.097-0.676e-3*T_c\text{(where }T_c\text{ is in centigrade)}$$

The value $V_{TEST}$ (i.e., the voltage measured at node TSD_Test shown on FIG. 3), therefore, is linear and varies with ambient temperature. The value of $V_{TEST}$ reaches zero at the $T_{LIM}$ value for detector 300. Accordingly, in the present example, it is possible to determine that $V_{TEST}$ has a value of 0 at $$T = \frac{0.141}{0.33\text{ m}} = 417\text{ K} = 144$$

degrees Celsius. At ambient temperatures below $T_{LIM}$, the voltage $V_{TEST}$ is proportional to the difference between ambient temperature and $T_{LIM}$ with a slope of −0.338 mV/degree. Accordingly, in the present example, a value of $V_{TEST}$ at a particular ambient temperature predicts the value of $T_{LIM}$ for the detector according to the following equation:

$$T_{LIM} = T_{ambient} + \frac{V_{TEST}}{0.676e-3}$$

Figure 4:
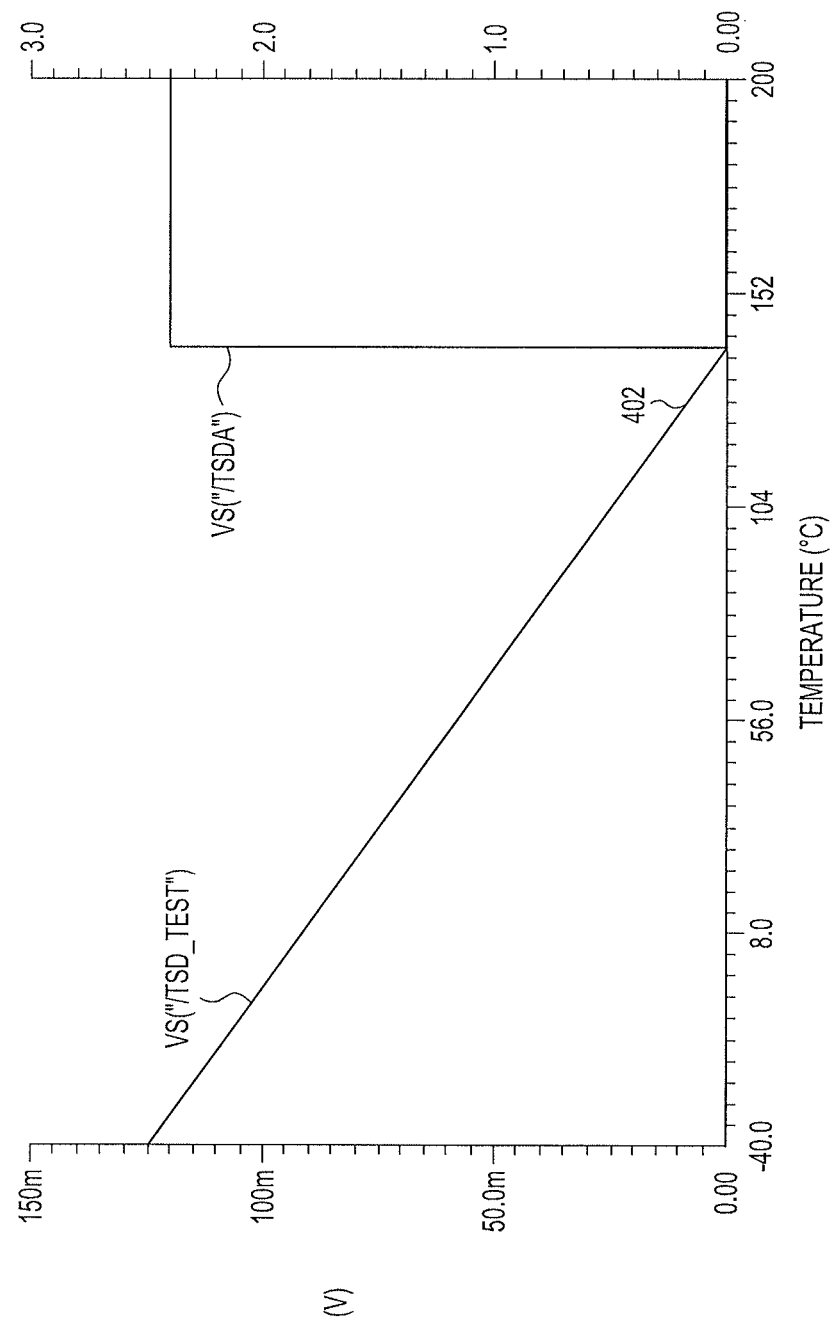
FIG. 4 is a graph depicting a measured voltage $V_{TEST}$ versus ambient temperature for the present over-temperature detector.

To illustrate, FIG. 4 is a graph depicting the measured voltage $V_{TEST}$ (vertical axis) versus ambient temperature (horizontal axis). As depicted, at ambient temperatures below the $T_{LIM}$ of the over-temperature detector 300 (illustrated by point 402), the value of $V_{TEST}$ is linear with a well defined slope. Additionally, the value of $V_{TEST}$ goes to zero when the ambient temperature is equal to the $T_{LIM}$ for the detector.

Using detector 300, therefore, an external testing system or controller (e.g., block 310 on FIG. 3) could be connected to detector 300 to test the circuit and determine the $T_{LIM}$ value of detector 300. To do so, switch 308 would first be set to render test circuit 302 operational. Switch 308 could be closed by testing system 308, or some other external system. With switch 308 closed, controller 310 would determine the ambient temperature of detector 300 as well as measure a voltage at node TSD_Test (i.e., $V_{TEST}$). The ambient temperature may be determined by direct measurement, or could be determined by an external testing setup so controller 310 may be programmed with the ambient temperature or may retrieve an ambient temperature setting from the testing setup. With both the ambient temperature and $V_{TEST}$ measured, controller 310 could use those values to calculate the $T_{LIM}$ value for detector 300. This is possible because, as detailed above, the voltage value at the TSD_Test node is predictable, varying with ambient temperature and the $T_{LIM}$ value and reaches a value of zero at the $T_{LIM}$ value for detector 300. Knowing both the ambient temperature and the voltage at the TSD_Test node, therefore, controller 310 can calculate the $T_{LIM}$ value for detector 300.

The operation of measurement circuit 302 can therefore be generalized as employing a feedback loop to convert the over-temperature detector of FIG. 1, which operates as a comparator by comparing two inputs, into a form of operational amplifier, which does attempt to balance its inputs. The resulting operational amplifier has an input offset that is nearly proportional to the difference in temperature between a reference temperature (e.g., the over-temperature detector's $T_{LIM}$) and the ambient temperature.

The amount of current required to balance the inputs can be measured and used to determine the difference between ambient temperature and the over-temperature detector's $T_{LIM}$. In such an arrangement, the inputs to the op-amp are the emitters of transistors Q1 and Q0 and the feedback loop is formed by closing switch 308. With switch 308 closed, the feedback loop drives the operational amplifier to balance the inputs at temperatures lower than the reference temperature $T_{LIM}$. The feedback drive in this configuration is unidirectional in that the feedback only modifies one of the comparator's input signals (i.e., the emitter of Q1), and only in a single direction to move the inputs towards balance when the detector is at an ambient temperature lower than the reference temperature $T_{LIM}$.

Once the feedback loop is closed, detector 300, now operating as an operational amplifier, attempts to balance its inputs by pulling current through resistance R1 connected to the input formed by the emitter of transistor Q1. That same current flows through R3, generating an output TSD_TEST. In effect, the output TSD_TEST measures the voltage 'error' at the inputs and generates that error multiplied by the ratio of R3 to R1 at the output. Because the voltage error becomes zero at the normal (unmodified) trip point (i.e., when the ambient temperature is equal to the circuit's $T_{LIM}$), and linearly increases away from that, the value of the voltage generated across R3 (TSD_TEST) is proportional to the difference between the ambient temperature and the circuit's $T_{LIM}$.

In some cases, two or more detectors 300 may be incorporated into a single system. In such an implementation, switch 308 of each of the two or more detectors 300 may be utilized to multiplex the output signal TSD_test enabling a single controller or test system to selectively receive the TSD_test output value from one of the detectors 300. In such an implementation, the various over-temperature detectors 300 may be configured to each include separate switches 308, but share the same controller 310 and, optionally, resistances R3.

Figure 5:
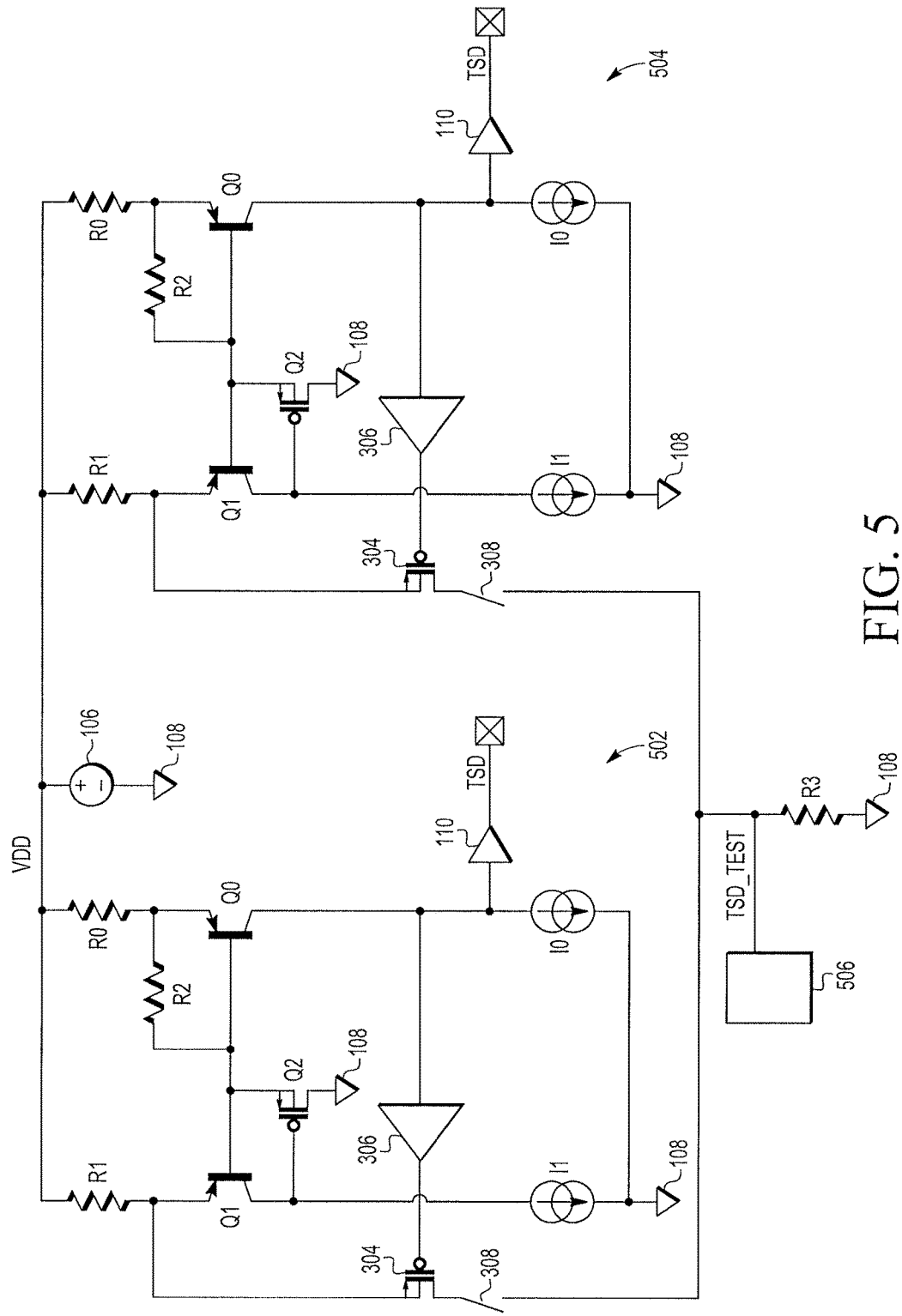
FIG. 5 is a schematic depicting a device incorporating multiple over-temperature detectors interconnected to a controller configured to selectively determine a temperature threshold value for each one of the multiple over-temperature detectors.

To illustrate, FIG. 5 is a schematic depicting a device incorporating multiple over-temperature detectors. A controller is connected to each over-temperature detector and is configured to selectively determine a $T_{LIM}$ value for each one of the multiple detectors.

In FIG. 5, two over-temperature detectors 502 and 504 are illustrated. Each of detectors 502 and 504 are configured in a similar manner to over-temperature detector 300 of FIG. 3. Over-temperature detectors 502 and 504 may include separate voltage sources 106 (as shown in FIG. 5) or may instead be connected to a single voltage source. Switches 308 of each of over-temperature detectors 502 and 504 are connected to the node TSD_TEST across resistor R3. Resistor R3 is similarly configured to resistor R3 shown in FIG. 3.

Controller 506 is configured to selectively close one of switches 308 to couple either detector 502 or 504 to the node TSD_TEST. With one of switches 308 closed, controller 506 can then measure a voltage at node TSD_TEST across resistor R3 and, using the approaches described above, determine the $T_{LIM}$ value for the corresponding detector 502 or 504.

In this manner, a number of over-temperature detectors 300 can be incorporated into a single system and the output signal TSD_test can be multiplexed enabling a single controller 506 to selectively receive the TSD_test output value from one of the over-temperature detectors. Although FIG. 5 only shows two over-temperature detectors 502 and 504, any number of over-temperature detectors may be incorporated into a single system using this approach.

In one embodiment, a device includes a temperature detection circuit. The temperature detection circuit includes a first path including a first transistor connected between a voltage node and a ground node, and a second path including a second transistor connected between the voltage node and the ground node. When an ambient temperature of the temperature detection circuit is less than a temperature threshold, a voltage at an emitter terminal of the second transistor is less than a voltage at an emitter terminal of the first transistor minus $V_T*\ln(N)$, where $V_T$ is thermal voltage and N is a ratio of a current density of the first transistor to a current density of the second transistor, and when the ambient temperature of the temperature detection circuit is greater than the temperature threshold, the voltage at the emitter terminal of the second transistor is greater than a voltage at the emitter terminal of the first transistor minus $V_T*\ln(N)$. The device includes a measurement circuit including a third transistor including a gate terminal connected to a collector terminal of the second transistor and a source terminal connected to the emitter terminal of the first transistor, and an output node connected to a drain terminal of the third transistor and configured to generate an output voltage that is proportional to a difference between the temperature threshold of the temperature detection circuit and the ambient temperature of the temperature detection circuit.

In another embodiment, a device includes a temperature detection circuit. The temperature detection circuit includes a first path including a first transistor connected between a voltage node and a ground node, a second path including a second transistor connected between the voltage node and the ground node, and a first output node configured to output a first voltage value when an ambient temperature of the temperature detection circuit is greater than a temperature threshold and a second voltage value when the ambient temperature of the temperature detection circuit is less than the temperature threshold. The device includes a measurement circuit including a third transistor including a gate terminal connected to a collector terminal of the second transistor and a source terminal connected to an emitter terminal of the first transistor, and a second output node configured to generate an output voltage that is proportional to a difference between the temperature threshold of the temperature detection circuit and the ambient temperature of the temperature detection circuit. The device includes a controller configured to determine an ambient temperature of the temperature detection circuit, measure the output voltage at the second output node of the measurement circuit, and determine the temperature threshold of the temperature detection circuit using the output voltage at the second output node of the measurement circuit and the ambient temperature of the temperature detection circuit.

In another embodiment, a device includes an output node configured to generate an output voltage that is proportional to a difference between a temperature threshold of a temperature detector and an ambient temperature of the temperature detector, a voltage node, and a ground node. The device includes at least two temperature detectors, each temperature detector including a first path including a first transistor connected between the voltage node and the ground node, a second path including a second transistor connected between the voltage node and the ground node, a thermal shutdown signal output configured to output a first voltage value when an ambient temperature of the temperature detector is greater than a temperature threshold and a second voltage value when the ambient temperature of the temperature detector is less than the temperature threshold, a third transistor including a gate terminal connected to a collector terminal of the second transistor and a source terminal connected to an emitter terminal of the first transistor, and a switch coupled to the third transistor and being configured to selectively connect a drain terminal of the third transistor to the output node. The device includes a controller configured to close the switch of one of the at least two temperature detectors, measure the output voltage at the output node, and determine the temperature threshold of the one of the at least two temperature detectors using the output voltage at the output node and an ambient temperature of the one of the at least two temperature detectors.

Although the present disclosure describes specific examples, embodiments, and the like, various modifications and changes can be made without departing from the scope of the present disclosure as set forth in the claims below. For example, although the exemplary methods, devices, and systems described herein are in conjunction with a configuration for the aforementioned device, the skilled artisan will readily recognize that the exemplary methods, devices, and systems may be used in other methods, devices, and systems and may be configured to correspond to such other exemplary methods, devices, and systems as needed. Further, while at least one embodiment has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims.

What is claimed is:

1. A device, comprising:
    a temperature detection circuit, including:
        a first path including a first transistor connected between a voltage node and a ground node, and
        a second path including a second transistor connected between the voltage node and the ground node, wherein, when an ambient temperature of the temperature detection circuit is less than a temperature threshold, a voltage at an emitter terminal of the second transistor is less than a voltage at an emitter terminal of the first transistor minus $V_T*\ln(N)$, where $V_T$ is thermal voltage and N is a ratio of a current density of the first transistor to a current density of the second transistor, and when the ambient temperature of the temperature detection circuit is greater than the temperature threshold, the voltage at the emitter terminal of the second transistor is greater than a voltage at the emitter terminal of the first transistor minus $V_T*\ln(N)$, and
    a measurement circuit, including:
        a third transistor including a gate terminal connected to a collector terminal of the second transistor and a source terminal connected to the emitter terminal of the first transistor, and
        an output node connected to a drain terminal of the third transistor and configured to generate an output voltage that is proportional to a difference between the temperature threshold of the temperature detection circuit and the ambient temperature of the temperature detection circuit.

2. The device of claim 1, including a resistor coupled between the emitter terminal of the second transistor and a base terminal of the second transistor.

3. The device of claim 1, including a first resistor connected between the first transistor and the voltage node and a second resistor connected between the second transistor and the voltage node.

4. The device of claim 3, including a first current source connected between the first transistor and the ground node and a second current source connected between the second transistor and the ground node.

5. The device of claim 4, wherein a current through the first transistor is about equal to a current through the second transistor when a first current generated by the first current source has a magnitude of about twice that of a magnitude of a second current generated by the second current source.

6. The device of claim 1, including an amplifier connected between the collector terminal of the second transistor and the gate terminal of the third transistor.

7. The device of claim 1, including a fourth transistor, the fourth transistor including:
    a source terminal connected to a base terminal of the first transistor and a base terminal of the second transistor; and
    a gate terminal connected to a collector terminal of the first transistor.

8. The device of claim 1, wherein the measurement circuit includes a switch coupled to the third transistor of the measurement circuit, the switch being configured to selectively activate and deactivate the measurement circuit.

9. The device of claim 1, further comprising:
    a controller configured to:
        measure the output voltage at the output node of the measurement circuit, and
        determine the temperature threshold of the temperature detection circuit using the output voltage at the output node of the measurement circuit and the ambient temperature of the temperature detection circuit.

10. A device, comprising:
    a temperature detection circuit, including:
        a first path including:
            a first transistor connected between a voltage node and a ground node, and
            a first current source connected between the first transistor and the ground node,
        a second path including:
            a second transistor connected between the voltage node and the ground node, wherein, when an ambient temperature of the temperature detection circuit is less than a temperature threshold, a voltage at an emitter terminal of the second transistor is less than a voltage at an emitter terminal of the first transistor minus $V_T*\ln(N)$, where $V_T$ is thermal voltage and N is a ratio of a current density of the first transistor to a current density of the second transistor, and when the ambient temperature of the temperature detection circuit is greater than the temperature threshold, the voltage at the emitter terminal of the second transistor is greater than a voltage at the emitter terminal of the first transistor minus $V_T*\ln(N)$, and a second current source connected between the second transistor and the ground node; and a measurement circuit, including:

a third transistor including a gate terminal connected to a collector terminal of the second transistor and a source terminal directly connected to the emitter terminal of the first transistor, and an output node directly connected to a drain terminal of the third transistor, the output node being configured to generate an output voltage that is proportional to a difference between the temperature threshold of the temperature detection circuit and the ambient temperature of the temperature detection circuit.

11. The device of claim 10, further comprising:

a controller configured to:

measure the output voltage at the output node of the measurement circuit, and determine the temperature threshold of the temperature detection circuit using the output voltage at the output node of the measurement circuit and the ambient temperature of the temperature detection circuit.

12. The device of claim 10, including a resistor coupled between the emitter terminal of the second transistor and a base terminal of the second transistor.

13. The device of claim 10, including a first resistor connected between the first transistor and the voltage node and a second resistor connected between the second transistor and the voltage node.

14. The device of claim 13, including a first current source connected between the first transistor and the ground node and a second current source connected between the second transistor and the ground node.

15. The device of claim 14, wherein a current through the first transistor is about equal to a current through the second transistor when a first current generated by the first current source has a magnitude of about twice that of a magnitude of a second current generated by the second current source.

16. The device of claim 10, including an amplifier connected between the collector terminal of the second transistor and the gate terminal of the third transistor.

17. The device of claim 10, including a fourth transistor, the fourth transistor including:

a source terminal connected to a base terminal of the first transistor and a base terminal of the second transistor; and a gate terminal connected to a collector terminal of the first transistor.

18. The device of claim 10, wherein the measurement circuit includes a switch coupled to the third transistor of the measurement circuit, the switch being configured to selectively activate and deactivate the measurement circuit.

* * * * *